United States Patent
Tsujimoto et al.

(10) Patent No.: US 6,662,833 B2
(45) Date of Patent: Dec. 16, 2003

(54) APPARATUS FOR INCORPORATING COMPONENTS AND FILLING LIQUID FOR LIQUID-SEALED VIBRATION-PROOF MOUNT

(75) Inventors: Yoshikazu Tsujimoto, Nishiku (JP); Tsuyoshi Inada, Nishiku (JP); Akio Sasaki, Nishiku (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 5 days.

(21) Appl. No.: 10/162,787

(22) Filed: Jun. 5, 2002

(65) Prior Publication Data

US 2003/0183302 A1 Oct. 2, 2003

(30) Foreign Application Priority Data

Apr. 1, 2002 (JP) ........................................ 2002-099351

(51) Int. Cl.7 ................................................ F16F 13/06
(52) U.S. Cl. ........................... 141/269; 141/94; 141/284
(58) Field of Search ........................... 141/94, 250, 267, 141/269, 284

(56) References Cited

U.S. PATENT DOCUMENTS 4,154,270 A * 5/1979 Holmes .......................... 141/1

5,579,814 A * 12/1996 Jones et al. .................. 141/383

FOREIGN PATENT DOCUMENTS

JP          11 230235          8/1999

* cited by examiner

Primary Examiner—J. Casimer Jacyna

(57) ABSTRACT

An improved apparatus for conducting the operation of incorporating components and filling liquid for the assembly of a liquid-sealed vibration-proof mount by sequential steps of: depressing a liquid tank disposed above a main components body held to be faced upwardly toward it, installing an aperture at a bottom of the tank to the main body hermetically, supplying liquid onto the bottom to flow the liquid inside the main body and to store it on the bottom, incorporating a partition and other components into the main body in the liquid stored when detecting a definite liquid level with a liquid level detector tube and simultaneously sealing liquid, followed by discharging of the liquid from the bottom and removal of the liquid tank from the main body, whereby the operation can be conducted efficiently without causing error operation and suspending by use of a liquid tank having a small volume. To that end, the liquid level detector tube has valve means suppressing pulsation of the liquid surface to the extent that the liquid level can be detected correctly.

4 Claims, 11 Drawing Sheets

APPARATUS FOR INCORPORATING COMPONENTS AND FILLING LIQUID FOR LIQUID-SEALED VIBRATION-PROOF MOUNT

BACKGROUND OF THE INVENTION

1. Field of the Invention

This invention relates to an apparatus for incorporating or assembling components and simultaneously filling liquid for the assembly of a liquid-sealed vibration-proof mount, which is principally used for supporting an automotive engine, etc. in a vibration-proof manner.

2. Description of Related Art

As a mount for supporting and bearing an automotive engine or the like so as not to transmit its vibrations to the vehicle body, there is known a liquid-sealed vibration-proof mount as exemplified in FIG. 12, which comprises a main body fitting 2 of a circular form, a rubber elastomer 3 as a vibration-isolating base and a diaphragm 4 thereby constituting part of a room wall and an interior of a main body filled with liquid, a partition 5 partitioning the interior into upper and lower liquid chambers 6a, 6b so that both liquid chambers may communicate with each other through an orifice 7 in the partition 5, whereby vibrations are attenuated and absorbed owing to the liquid fluidization resistance by the orifice 7 and the vibration-isolating effect of the rubber elastomer 3.

Such a liquid-sealed type of vibration-proof mount is assembled in such a procedure that main components body 1 having an interior space for filling liquid is beforehand fabricated by vulcanization-bonding the rubber elastomer 3 to an opening end side of the main body fitting 2 and vulcanization-bonding an attachment fitting 8 to the rubber elastomer 3; companion components to the main components body 1, i.e. the partition 5, the diaphragm 4 and so on are incorporated into the main components body 1 and concurrently, the interior is filled with liquid in a sealing manner.

For the work of incorporating or assembling the components into the main body 1 and of sealing liquid in the assembly of the above-mentioned vibration-proof mount, a rather large liquid tank has been hitherto used. This components incorporating work was conducted in liquid by setting sequential steps comprising: a step of setting and holding the main components body within the liquid in this liquid tank, a step of incorporating the components including the partition, diaphragm, etc. into the main components body, a caulking step for locking the components thus incorporated and assembled, and a step of removing the mount thus assembled out of the liquid tank.

With the conventional system of simultaneously incorporating components and sealing liquid for the vibration-proof mount, large-scale conveying means as well as a large-sized liquid tank were needed and accordingly, an installation space for them becomes large and besides, the change work in setting height, treatments against troubles and maintenance control were awkward and troublesome. Moreover, extraneous matters such as molding sand, rubber remnant, etc. tended to creep in the liquid tank, which were likely to be responsible for entrainment of bubbles, etc. causing a poor assembling. Further problem was that cleaning work for an outer peripheral portion of the mount product after assembly was troublesome.

To overcome the prior art problems described above, therefore, the present inventors have formerly proposed a system for incorporating components and sealing liquid using a relatively small liquid tank, which is disclosed in JP Patent Publication 11(1999)-230235 A.

The formerly proposed system comprises, while holding a main components body faced upwardly in a nearly upright state, depressing a liquid tank that is positioned upwardly of the main components body to be capable of ascending or descending and possesses an aperture at a part of its bottom; fitting the aperture to an outer periphery of the main components body to install the tank to the main components body so as to maintain a sealing state; supplying liquid onto the bottom of the liquid tank where the aperture is disposed, thus flowing the liquid into the interior space of the main components body through its opening and storing a required amount of liquid on the bottom; soaking components, i.e. a partition, a diaphragm and so on in the liquid, as it is stored, and fitting them, under deaeration, into the interior and the opening of the main components body by actuating a components incorporating mechanism composed of a multi-spindle articulated robot, etc. thereby incorporating them and filling liquid; and thereafter discharging the liquid stored in the liquid tank out of the bottom and removing the liquid tank from the main components body.

Here, when incorporating components in the condition that the liquid is supplied and stored on the bottom of the liquid tank, it is required to ensure that a liquid level height of the stored liquid be more than a definite value, from the viewpoints of conducting deaeration operation of the components and preventing entrainment of bubbles. That is, the less the liquid amount and the lower the liquid level height, the more difficult is the deaeration operation and the more easily are the bubbles entrained. As a consequence, it is necessary to replenish the liquid appropriately, depending on the decrease or decrement in liquid amount every liquid sealing work.

To that end, it was contrived to provide liquid replenishing means for replenishing liquid to the liquid tank such as a pump together with a liquid level detector tube for detecting the liquid level height, by means of which the fact that the liquid level height has reached a definite level is detected as a detection signal, on the basis of which the actuation of the components incorporating mechanism may be controlled. On the other hand, in cases where the liquid level height does not reach a definite level, the liquid replenishing means is actuated on the basis of the detection signal so that liquid may be replenished.

In cases where the liquid is supplied onto the bottom of the liquid tank every work for incorporating components and sealing liquid as mentioned above, however, the problems were encountered that the liquid level was liable to fluctuate up and down owing to the fluidization action of the liquid when supplied and impacts upon incorporation of components by means of a hand of the components incorporating mechanism. Further also inside the liquid level detector tube, the liquid will pulsate up and down accompanied thereby. Stated another way, due to the aforementioned pulsation, the liquid level detector tube will detect that the liquid level has reached a definite level earlier than the actual rise in liquid level or will detect repeatedly the situations where the liquid level height is above and below the definite level.

As a result, the actuation of the components incorporating mechanism comes to start earlier and the deaeration operation upon incorporation of components will be insufficient, which leads to a danger of entrainment of bubbles. Otherwise the components incorporating mechanism will cause an error operation or the operation of it will be frequently suspended, which is responsible for failure of the mechanism and detracts from the durability.

SUMMARY OF THE INVENTION

The present invention has been made to solve the foregoing problems of the components incorporating and liquid sealing apparatus mentioned above taking advantage of the ascending and descending of the liquid tank and the liquid supply and discharge actions. Accordingly, the invention is aimed at enabling the liquid level height upon supplying of liquid to be detected accurately thereby ensuring the control of the apparatus based on the detecting signal and at enabling the components incorporating and liquid sealing work to be carried out with high efficiency.

The invention is concerned, in a broad sense, with an apparatus for incorporating components and sealing liquid for the assembly of a liquid-sealed vibration-proof mount, which comprises a setting and holding section for a main components body, wherein the main components body for the vibration-proof mount having an interior space and an opening at one end side thereof is supported and secured in place in a substantially upright state with the opening faced upwards; a liquid tank positioned upwardly of the main body setting and holding section so as to be capable of ascending and descending, the liquid tank having at its bottom an aperture which can be fitted hermetically to an outer peripheral portion of the main components body and capable of storing liquid on the bottom in the condition that the liquid tank is assembled to the main components body by fitting of the aperture to it; liquid tank elevating or depressing means supporting the liquid tank located upwardly of the main body setting and holding section and lowering the liquid tank toward the main components body so as to fit the aperture to the main components body and raising the liquid tank so as to release from the main components body; liquid supply and discharge means for supplying or discharging the liquid onto or from the bottom of the liquid tank having the aperture in conformity with the installing action or removal action of the liquid tank in or from the main components body; liquid replenishing means for replenishing liquid whenever appropriate into the liquid tank; and a components incorporating mechanism for holding and shifting components inclusive of a partition and a diaphragm to the main components body in the liquid as stored on the bottom of the liquid tank, thereby conducting incorporating operation. In the aforementioned apparatus, the invention is characterized in that a liquid level detector tube for detecting a liquid level height upon supplying of liquid onto the bottom is disposed to be coupled to the liquid tank and further provided with valve means suppressing pulsation of the liquid surface; and the liquid level detector tube is adapted and constructed so that the actuation of the aforesaid components incorporating mechanism may be controlled on the basis of detecting signals of the liquid level height by means of the liquid level detector tube.

According to this apparatus for incorporating components and sealing liquid of this invention, the main components body of the anti-vibratory mount is held in a substantially upright state with its opening faced upwardly by means of the main body setting means, whereas the liquid tank positioned upwardly of the setting means is depressed and mounted to the main components body by fitting the aperture at the bottom to it in a sealing condition. When liquid is supplied onto the bottom of the liquid tank in this manner, part of the liquid is flowed through the opening of the main components body into the interior space, where the liquid is filled, concurrently with which a predetermined amount of liquid is stored on the bottom.

At that time, the liquid level height on the bottom of the liquid tank is detected with the aid of the liquid level detector tube. When the liquid level height reaches above a definite level, the liquid level detector tube detects it to transmit a detecting signal, on the basis of which the aforesaid components incorporating mechanism is actuated. In particular, seeing that the liquid level detector tube is equipped with valve means for suppressing the pulsation of the liquid face inside it, even if the liquid inside the liquid tank fluctuates in a manner rising and falling to a great degree owing to the supply action of the liquid onto the bottom, the valve means at the liquid level detector tube serves to suppress the exhaustion of air. As a result, the liquid face moves slowly to suppress the pulsation and the liquid level height can therefore be detected correctly.

Further on the basis of the detecting signal when detecting a liquid level height of more than the definite level, the components incorporating mechanism is actuated so that components including a partition, a diaphragm, etc. are held, in order, and subjected to deaeration operation, for example by soaking in the stored liquid in a tilted posture and thereafter fitted, in a horizontal posture, into the main components body, which is received in the aperture of the bottom of the liquid tank, through its opening to incorporate them into it and concurrently, to seal the liquid in it. Should the liquid within the liquid tank fluctuate upon this incorporating operation, the liquid face within the liquid level detector tube is free from pulsating excessively, so that any error operation due to pulsation does not occur. Thereafter the components incorporating mechanism is restored to the initial condition and the liquid is discharged from the bottom of the liquid tank, and subsequently, the liquid tank is elevated and disengaged from the main components body. After the holding action by the main body setting and holding section is released, the vibration-proof mount thus assembled is conveyed from the main body setting and holding section to subsequent steps, e.g. crimping step and the assembly is completed.

According to the apparatus for incorporating components and sealing liquid of this invention as described above, the incorporating operation by means of the components incorporating mechanism is conducted so that while the main components body is being secured and held in place without shifting, a relatively small liquid tank is mounted by descending action to and removed by ascending action from the main components body and furthermore, liquid is supplied to or discharged from the bottom of the tank. Hence the incorporating operation of components is facilitated without soaking the entirety of the main components body in the liquid and the overall apparatus can thus be compactified.

In particular, on account of the fact that the liquid level height on the bottom of the liquid tank upon supplying of liquid is adapted to be detected correctly by suppressing the pulsation, the components incorporating work can be efficiently conducted without the occurrence of the problems that the components incorporating mechanism is actuated too early or its operation is suspended, and entrainment of bubbles can be avoided. Furthermore, the occurrence of failure of the apparatus is prevented and its durability is improved.

The aforementioned liquid level detector tube has vertically a detecting piping coupled to a lower part of the tank so that liquid can flow in it. The detecting piping is provided at least partly with a transparent tube part and a level sensor for detecting the liquid level height of inflow liquid at the transparent tube part so that detecting signals of the level sensor may be transmitted to an apparatus control section. By that provision, the detection of liquid level by means of the level sensor can be performed precisely. The adjustment of position of the level sensor facilitates setting an optimal liquid level height in conformity with the configuration of a vibration-proof mount and the shapes of components to be assembled.

The valve means for suppressing pulsation is provided at an exhaust part of the liquid level detector tube and includes an exhaust throttle valve limiting the exhaust volume upon inflow of liquid. Thereby with the rise of the liquid level on the bottom of the tank, for instance, when liquid flows in the detecting tube and the air within the detecting tube is expelled into the atmospheric air, this exhausting action is suppressed by the exhaust throttle valve, as a result of which the inflow speed of the liquid into the detecting piping is controlled to restrain the pulsation of liquid, thereby permitting the liquid level height to be detected correctly.

BRIEF DESCRIPTIONS OF THE DRAWINGS

The modes in which the invention is carried into effect will be hereinafter described in accordance with examples as illustrated in the accompanying drawings, in which.

DESCRIPTION OF THE PREFERRED EMBODIMENTS

Figure 1:
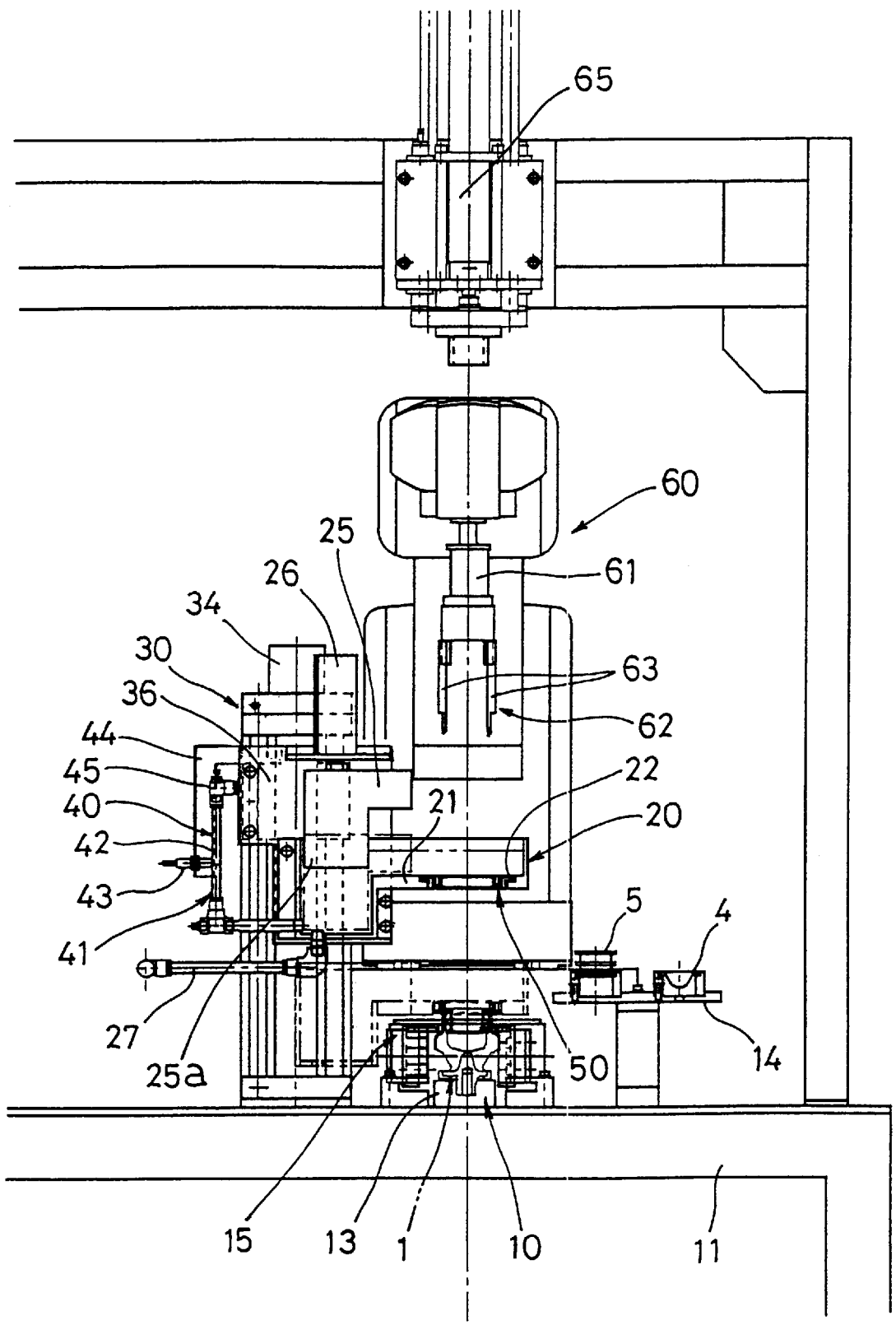
FIG. 1 is a front elevation of an overall apparatus for incorporating components and sealing liquid according to one example of this invention.
Figure 2:
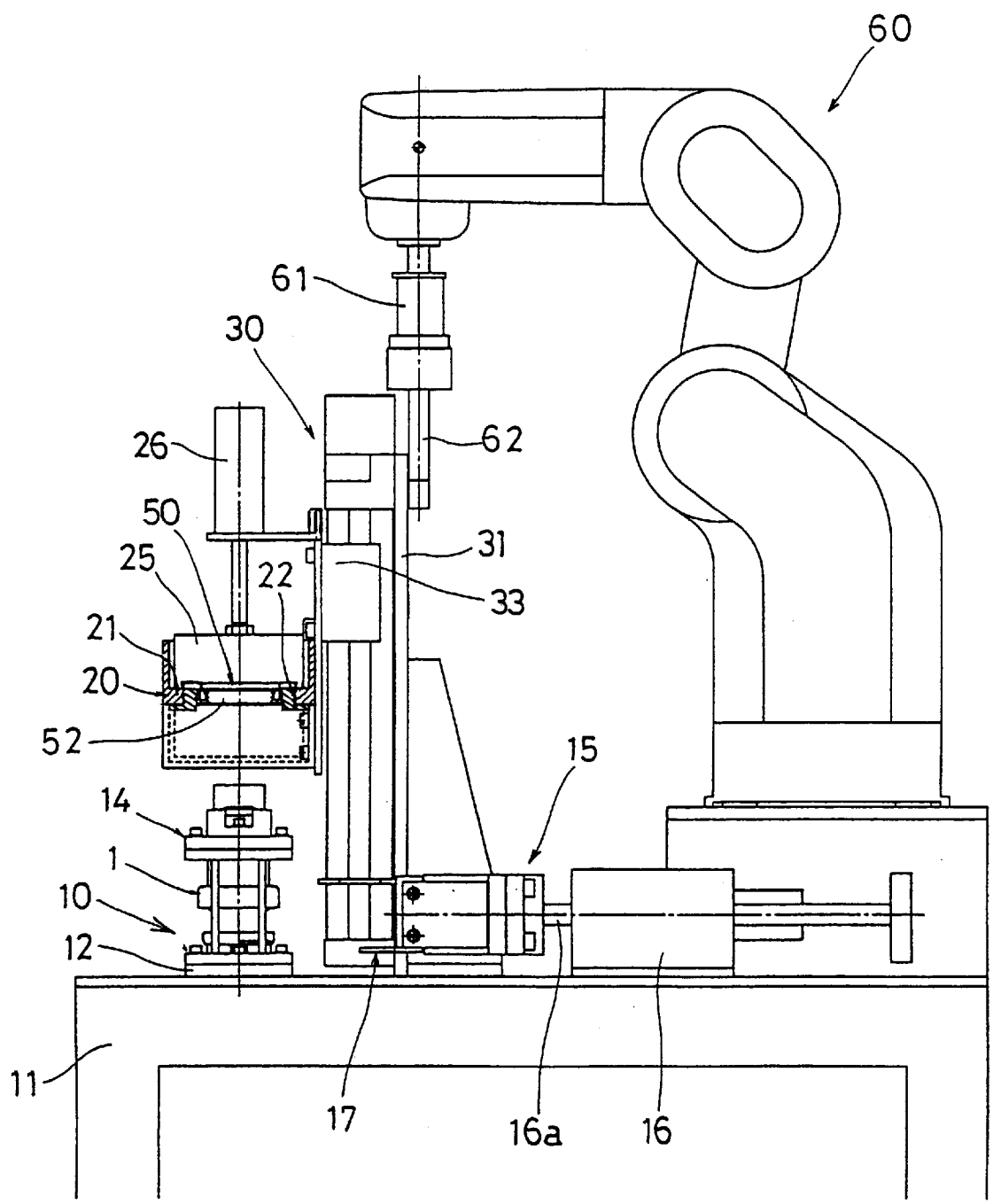
FIG. 2 is a side elevation of the apparatus in the aforesaid example showing essential parts thereof.
Figure 12:
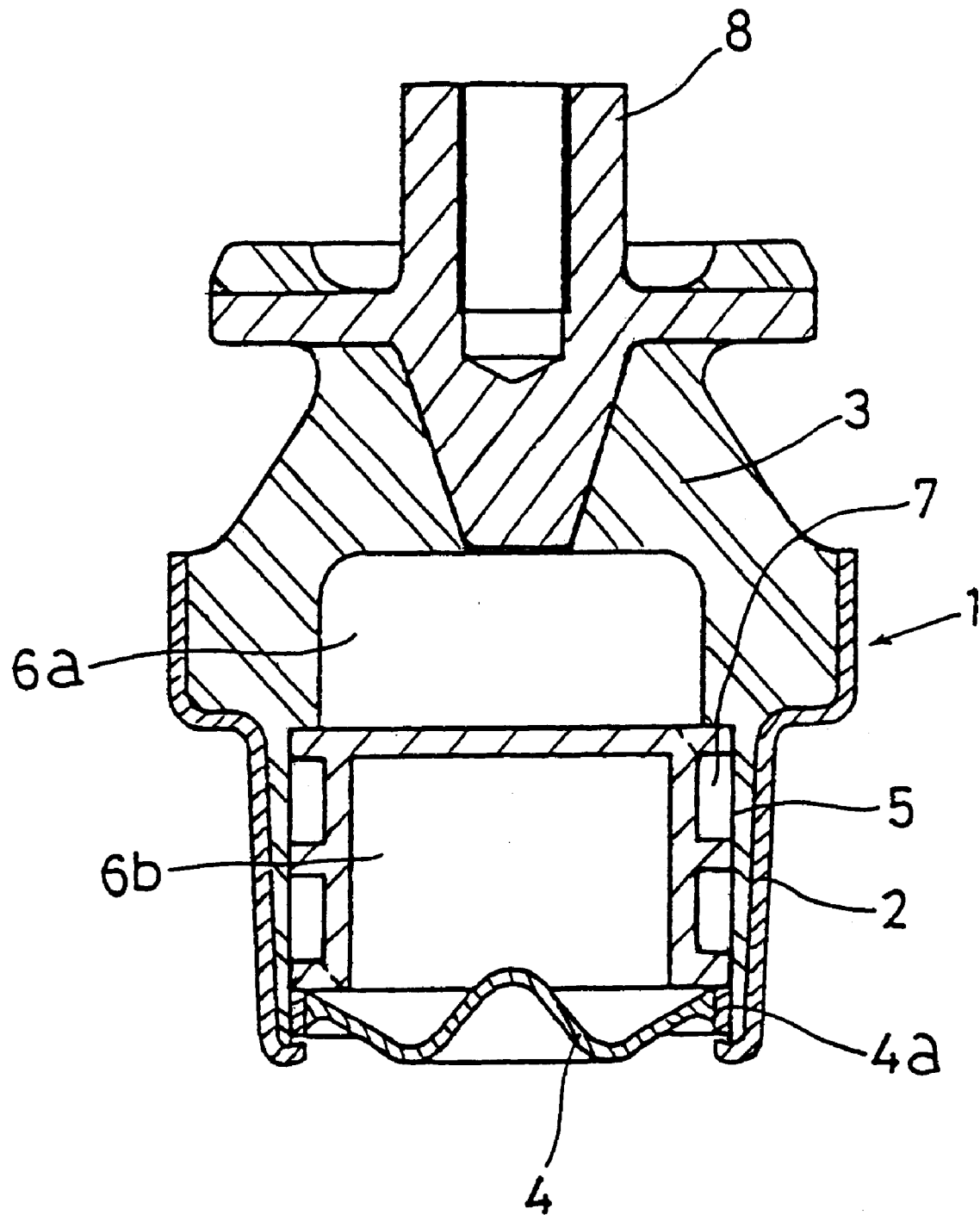
FIG. 12 is a sectional view exemplifying a liquid-sealed vibration-proof mount intended to be assembled.

Referring to FIGS. 1 and 2, the reference numeral 10 designates a main body setting and holding section for supporting and securing a main components body 1 at a predetermined setting position on a machine base 11. The main body setting and holding section 10 has a receiver support member 13 for the main components body 1 provided rigidly on a part of a plate 12 so that a main body of the vibration-proof mount as exemplified in FIG. 12, namely the main components body 1, which is formed by securing a rubber elastomer 3 as a vibration-isolating base to an opening part at one end side of a cylindrical main body fitting 2 by vulcanization bonding and farther fixing an attachment fitting 8 to the rubber elastomer 3 to form an interior space 9 for sealing liquid therein, may be supported with its opening faced upwardly.

The reference numeral 14 designates a components setting jig provided vertically on the plate 12 in the vicinity of the receiver support member 13 so that a partition 5 disposed in the interior of the vibration-proof mount and a diaphragm 4 may be furnished and rested on a preset definite position thereof.

Figure 6:
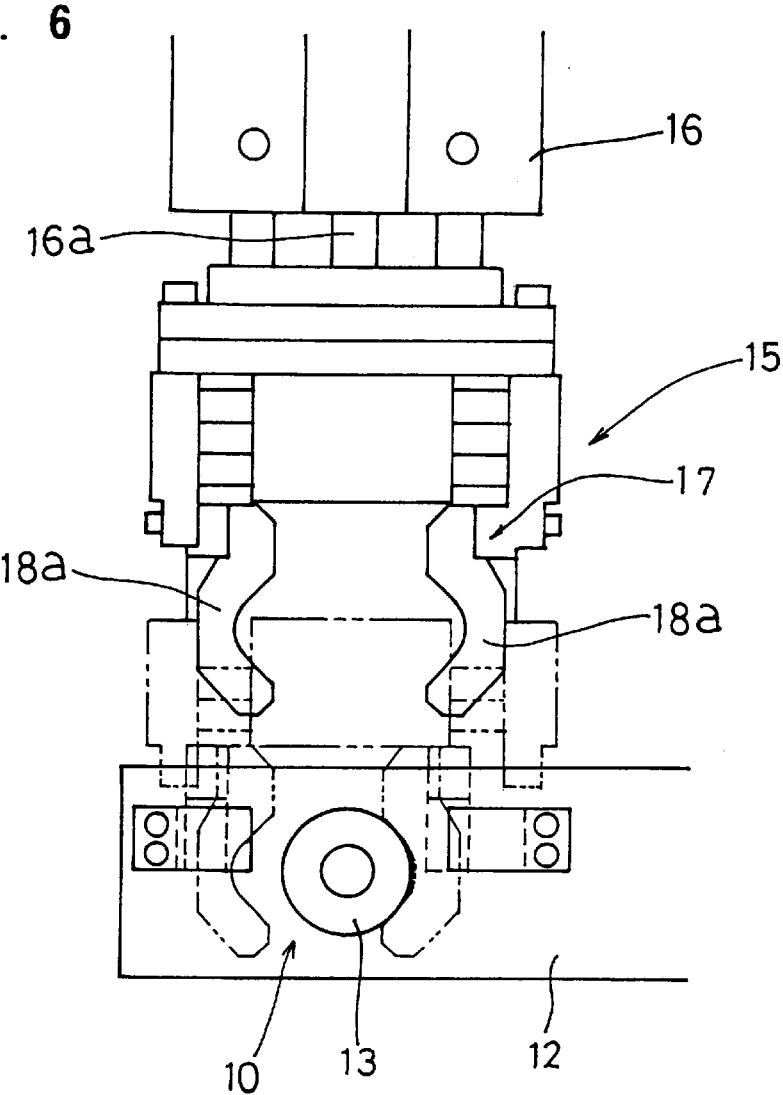
FIG. 6 is an enlarged plan view of a main body setting and holding section.
Figure 7:
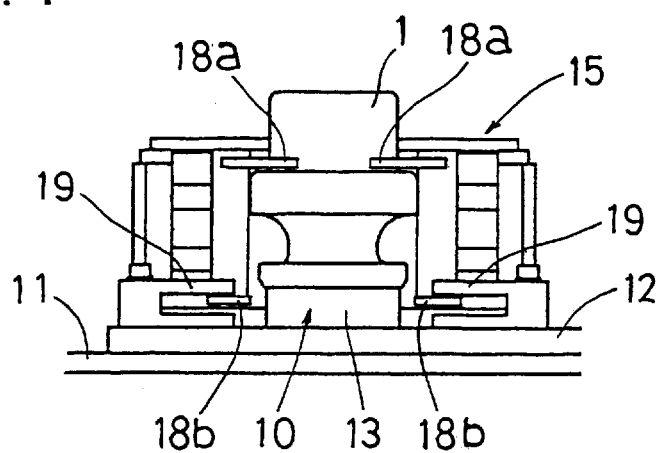
FIG. 7 is a front elevation of the main components body in its locked state in the aforesaid section.
Figure 8:
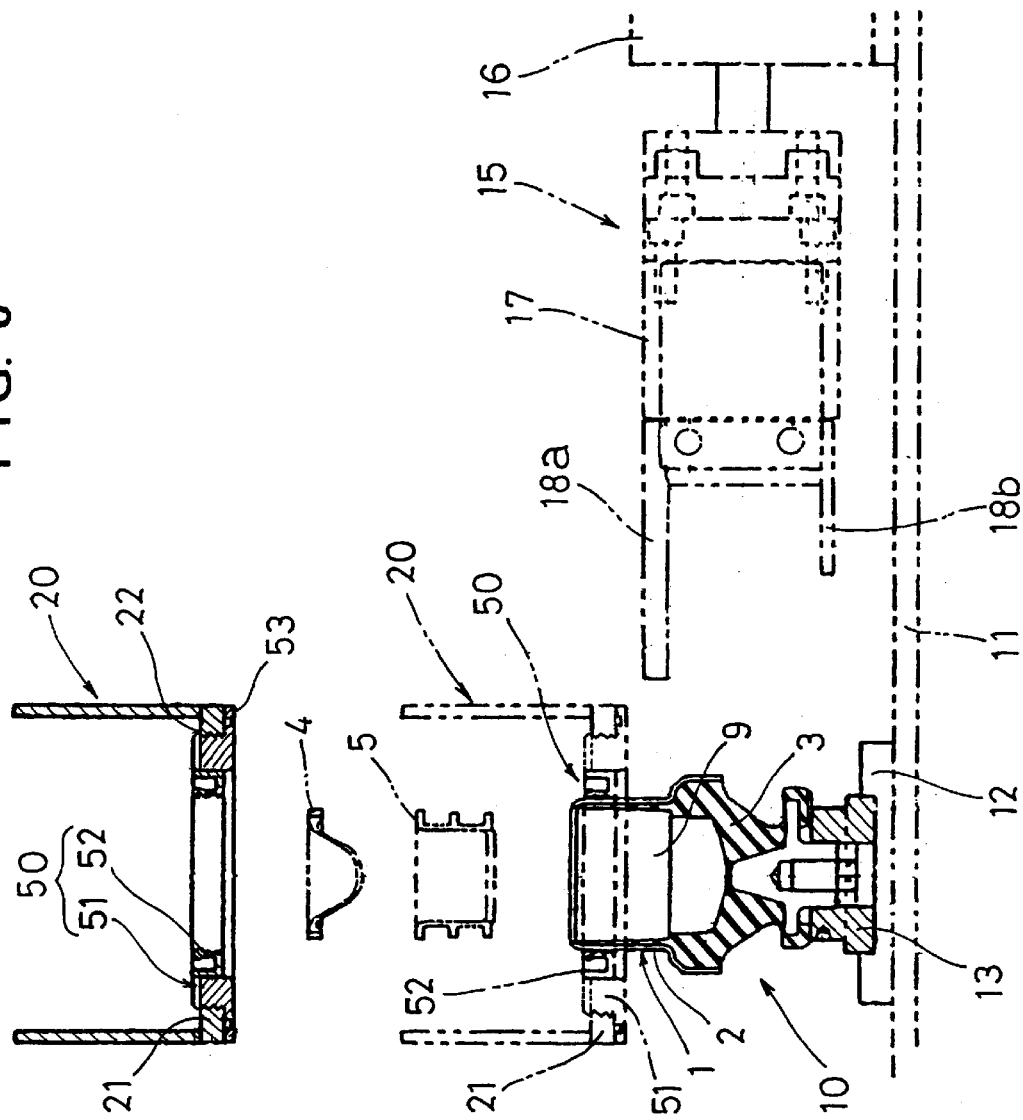
FIG. 8 is a sectional view showing a relation between the main body setting and holding section and the liquid tank.

The main body setting and holding section 10 is, as illustrated in FIGS. 6 to 8, equipped with a locking mechanism 15 holding the main components body 1 supported on the receiver support member 13 in a stationary state.

The locking mechanism 15 includes a cylinder unit 16 actuated by hydraulic pressure or pneumatic pressure and a chuck device 17 provided rigidly to front ends of output rods 16a. The locking mechanism is constructed so that when the main components body 1 is furnished on the receiver support member 13 of the main body setting and holding section 10, the cylinder unit 16 is actuated by a button-pressing operation or the like to advance the chuck device 17, which serves to grab the main components body 1 to secure and hold them in place.

The chuck device 17 is composed of pairs of claw pieces 18a, 18a and 18b, 18b capable of opening and closing located at upper and lower positions. The upper claw pieces 18a, 18a are provided so as to grab and pinch the main components body 1 from both sides whereas the lower claws 18b, 18b are provided so that they may engage with engagement members 19, 19 in the form of a generally transverse U form that are disposed in opposite to each other at both sides of the receiver support member 13 thereby restraining the upward displacement of the chuck device 17.

Figure 9:
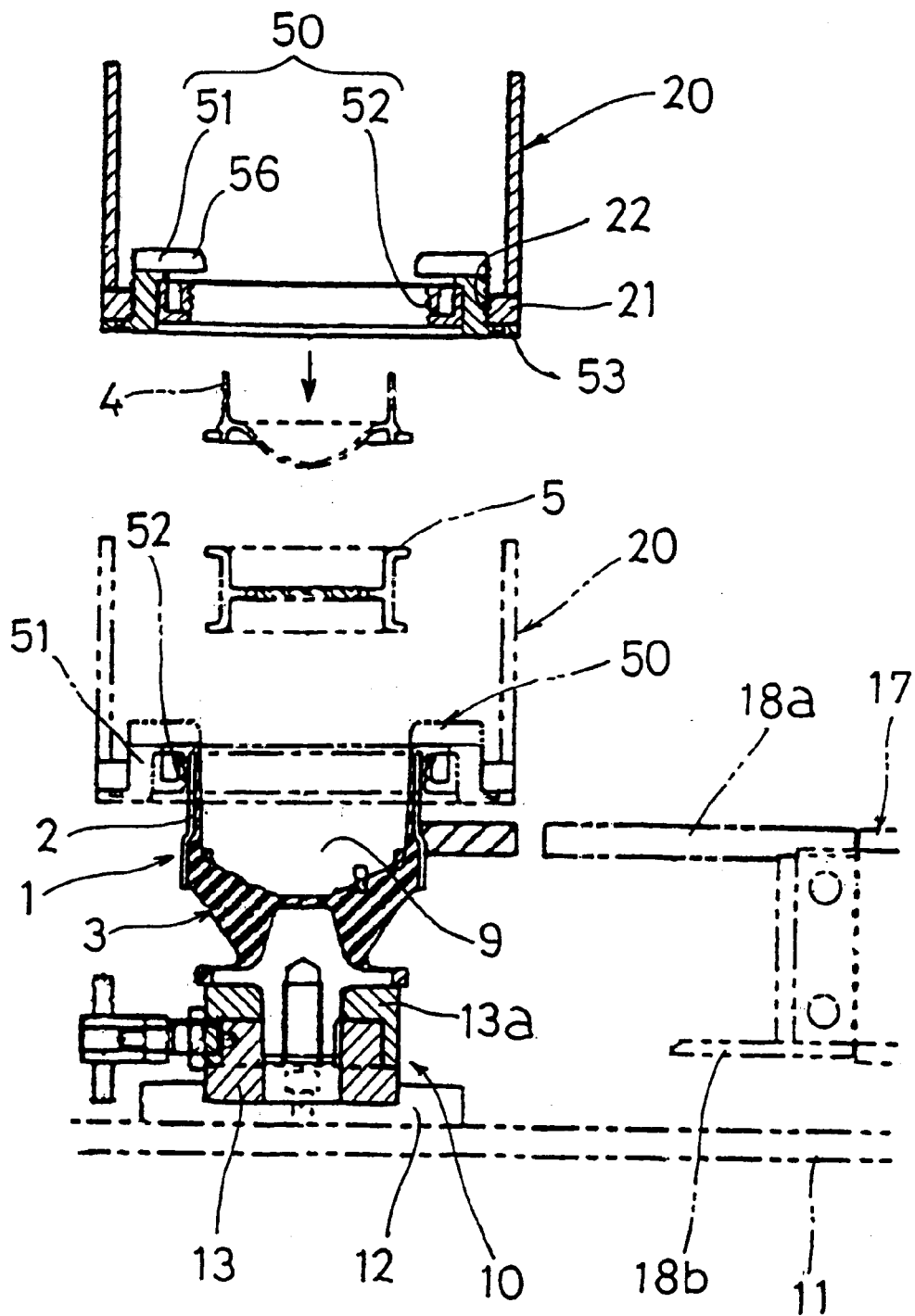
FIG. 9 is a sectional view showing another example of a relation between the main body setting and holding section and the liquid tank.

The receiver support member 13 is constructed so that it can meet a plural number of configurations of the main components body 1, taking the change in height of a vibration-proof mount intended to be assembled into consideration. For example, a spacer 13a for adjusting the height as shown in FIG. 9 is provided.

The reference numeral 20 is a liquid tank (or a liquid reservoir) supported upwardly of the main body setting and holding section 10 so as to be capable of ascending or descending with the aid of a tank elevating or depressing mechanism 30.

The tank elevating or depressing mechanism 30 is provided so that the liquid tank 20 may be lowered, with the main components body 1 set and secured to the main body setting and holding section 10 and installed to the main components body 1, as is described below, and after incorporation of respective components is completed, the liquid tank 20 may be removed from the main components body 1 and raised.

Figure 3:
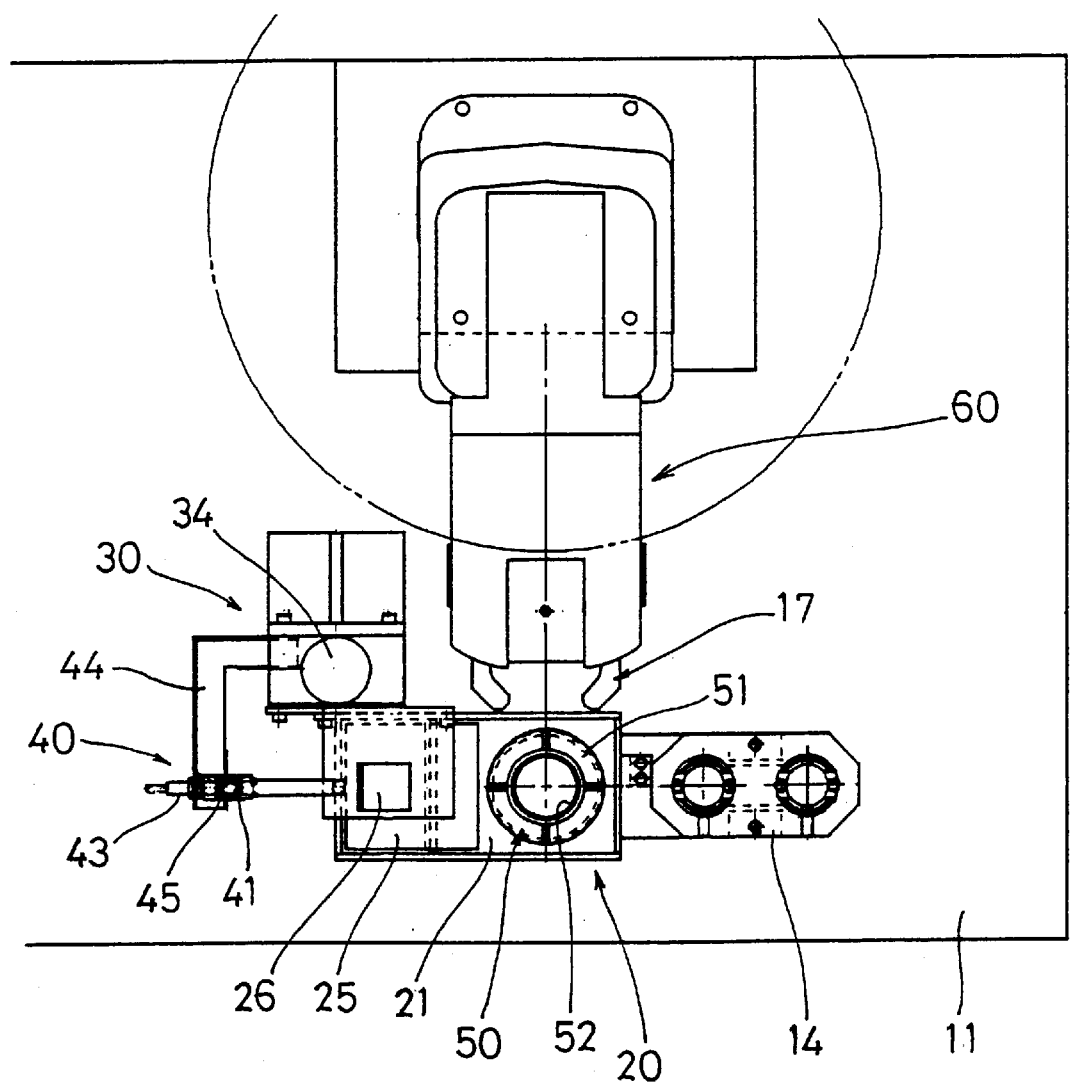
FIG. 3 is a plan view of the essential parts in the same example.

The tank elevating and depressing mechanism 30 is constructed using a single spool actuator. For example, the tank elevating or depressing mechanism has, as illustrated (FIGS. 2 to 4), a guide 32 disposed vertically on the machine base 11 in front of a support base plate 31 provided upright on the machine base 11, a slider 33 fitted in the guide 32 so as to be capable of ascending and descending, and a screw shaft 35 mating with the slider and rotationally driven with a drive means 34 such as a servo motor. The slider 33 is provided so that by the actuation of the drive means 34, the screw shaft 35 is revolved whereby the slider 33 moves upwardly or downwardly (ascends or descends). On an attachment plate 36 fixed to the slider 33, the liquid tank 20 is mounted so as to ascend or descend, accompanied by the ascending or descending movement of the slider 33. The tank elevating and depressing mechanism 30 is constructed so that the speed, position, etc. when installing the liquid tank 20 to the main components body 1 can by controlled minutely.

Otherwise, it is also possible to provide the slider 33 so as to be elevated or depressed by another means such as a cylinder unit.

Figure 4:
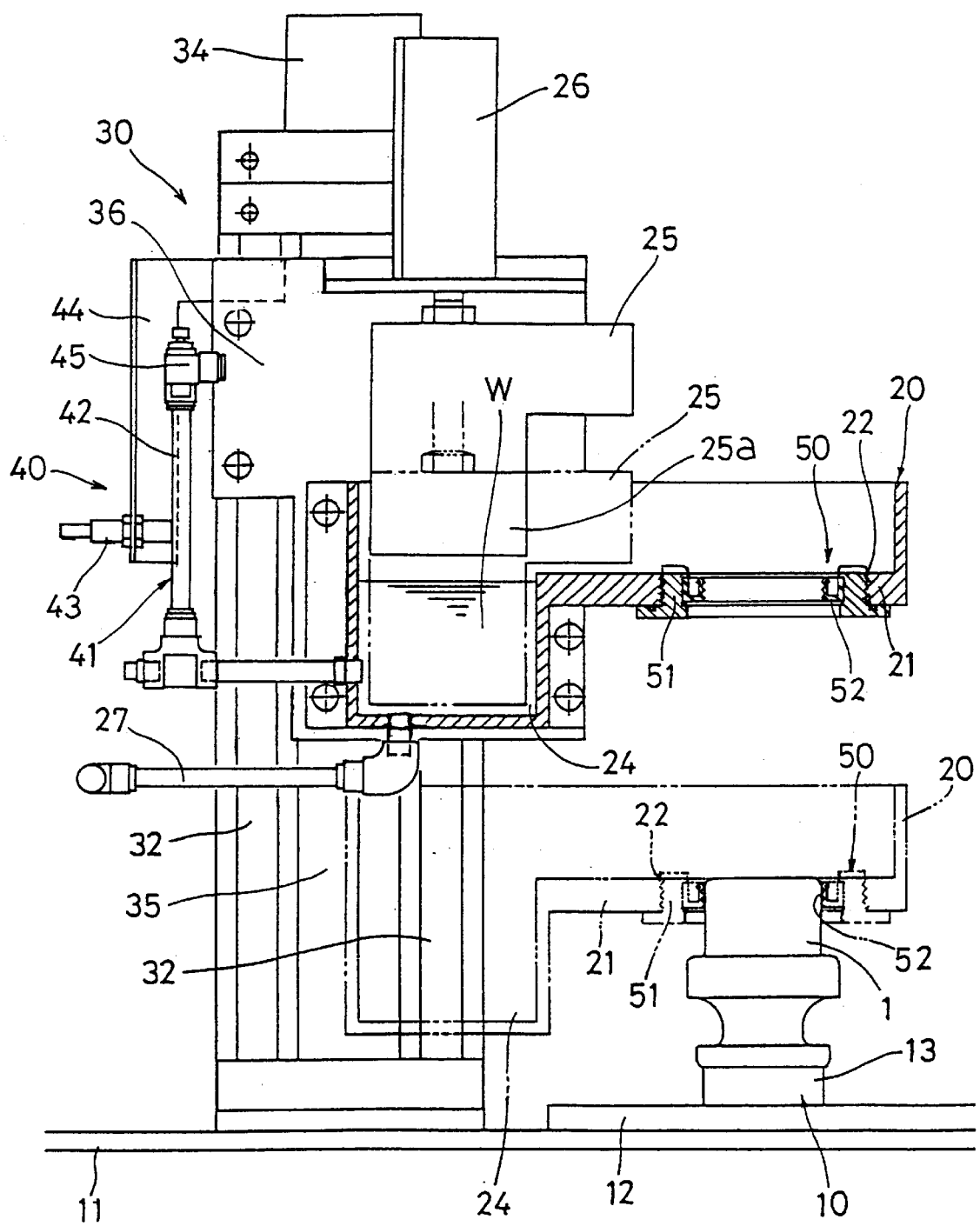
FIG. 4 is a schematic enlarged front elevation of a tank elevating or depressing means in the same example showing a liquid tank in cross-section.
Figure 5:
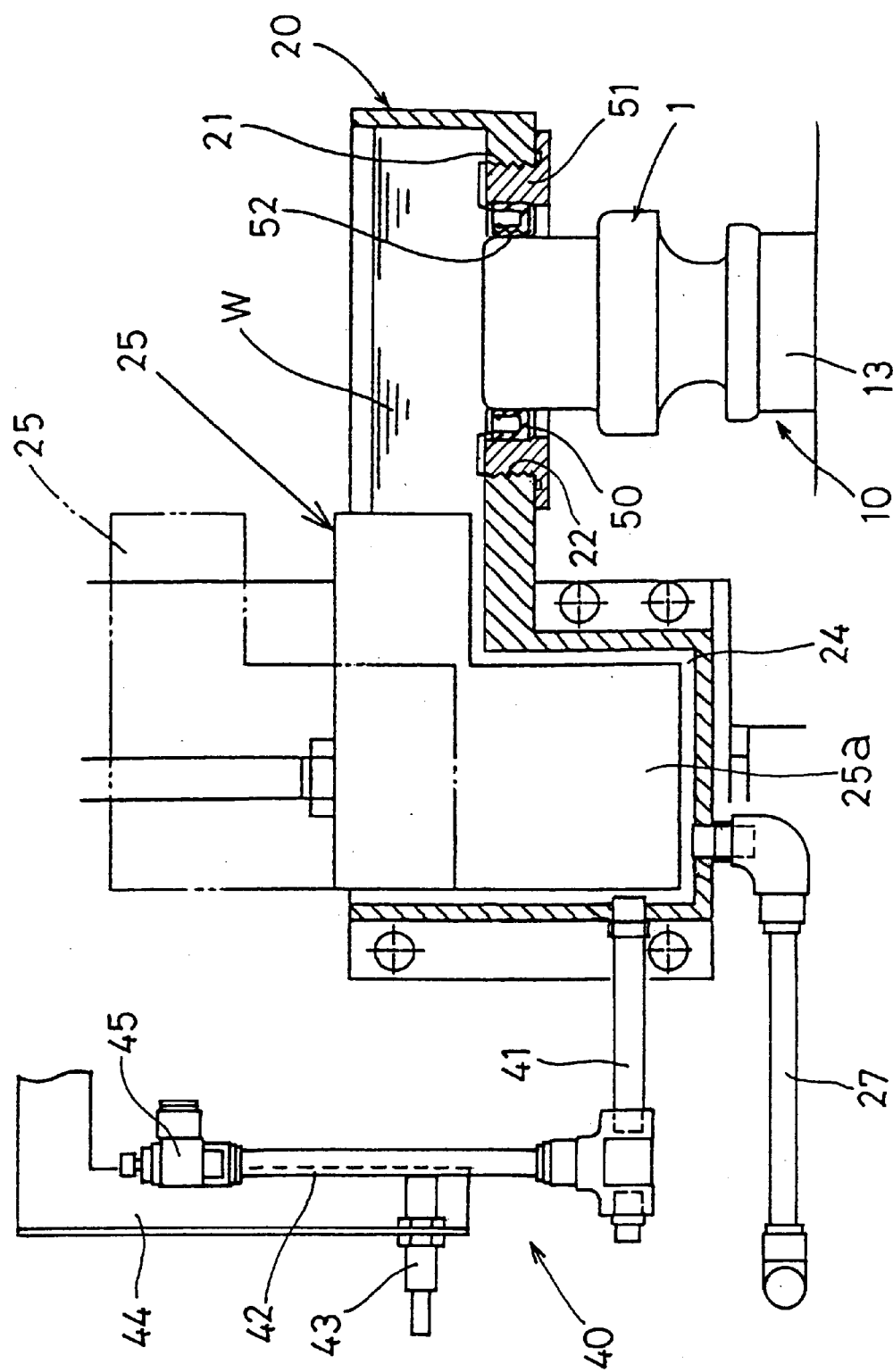
FIG. 5 is an enlarged sectional view of the liquid tank in the same example.

As shown in FIGS. 4 and 5 in an enlarged scale, the liquid tank 20 is provided, at its bottom 21 at a place corresponding to the main body setting position, with an aperture 22 that can be fitted to an upper outer periphery of the main components body 1 in a sealing condition. To an inner periphery of the aperture 22, a seal member 50 such as an oil seal is attached so that the aperture can be flexibly fitted to the main components body 1 at its outer periphery by descending of the liquid tank 20 thereby to retain the sealing condition. Furthermore the tank in the condition as installed to the main components body 1 is adapted so that a predetermined amount of liquid can be stored on the bottom 21.

The seal member 50 is detachably secured to the bottom 21 and provided so that it can be replaced with a seal member of a shape and a size conforming or corresponding to the type of a vibration-proof mount intended to be assembled, in particular the configuration of the main components body 1. For example, in cases where the seal member 50 comprises, as shown in FIG. 5 and FIG. 8 in an enlarged scale, a seal body 52 constructed of a rubber elastomer secured to an inner periphery of an annular outer peripheral part 51 made of a rigid material of metal, e.g. stainless steel, aluminum, etc. or synthetic resin by vulcanization bonding or press fitting means, the outer peripheral part 52 is releasably secured to an inner periphery of the aperture 22 at the bottom 21 of the liquid tank 20 by threading means from the underside of the bottom. FIG. 9 shows one example wherein the seal member 50 is varied in conformity with the change in the main components body 1. In this example of the seal member 50, its outer peripheral part 51 is provided, at an inner periphery of upper end thereof appearing above the bottom 21 in a projecting fashion, with an inner flange 56 for positioning, on which the upper end of the main components body 1 fitting in the seal body 52 abuts.

Further, liquid supply and discharge means for supplying liquid onto the bottom 21 of the liquid tank 20 and discharging the liquid is provided and constructed so that in the illustrated example (FIGS. 4, 5), at a part of the bottom excluding the vicinity of the aperture 22, which is formed at the bottom 21 at its one end side in the elongate direction, for example, a part of the other end side in the elongate direction, there is provided a recessed portion 24 so that a required amount of liquid W can be stored therein by dropping downwardly and besides, a loading float 25 having a protruding portion 25a capable of being fitted in the recessed portion 24 at its lower side is coupled to a cylinder unit 26 so as to be capable of ascending or descending by the actuation of the cylinder unit 26. Thus by the ascending and descending actions of the loading float 25, the liquid W stored in the recessed portion 24 can be supplied and charged to the bottom 21 or discharged out of the bottom 21.

More specifically stated, the loading float 25 is adapted to descend to be received into the recessed portion 24 whereby the liquid W in the recessed portion 24 is forced out upwardly onto the bottom 21 and stored there at a predetermined liquid level height; otherwise the loading float 25 is adapted to ascend whereby the liquid W on the bottom 21 is flowed back into the recessed portion 24.

The volume of the recessed portion 24 and the volume of the loading float 25 are determined and set so that when the loading float 25 descends to be received, a predetermined liquid level height necessary for the deaeration operation of components, which will be later described, may be ensured on the bottom 21 located outside the loading float 25.

The reference numeral 27 designates a replenishing tube connected to replenishing means such as a pump (not shown) for replenishing liquid to the liquid tank 20. The replenishing tube is coupled to a bottom of the recessed portion 24. Since every one time of liquid-sealing work the liquid is reduced, the liquid replenishing means is provided so that liquid can be replenished appropriately in the liquid tank 20 and stored in an amount more than a definite amount on the bottom 21 of the liquid tank 20 when the liquid is supplied by means of the liquid supply and discharge means, namely upon supplying of the liquid by descending of the loading float 25. Usually the pump as a liquid replenishing means is provided so as to be actuated on the basis of detection results of the liquid level height as described below. At the bottom of the recessed portion 24 there is also provided a discharge port (not shown) for discharging the liquid within the liquid tank 20 on the occasion of maintenance and inspection and cleaning.

Alternatively as another liquid supply or discharge means to or from the bottom 21 of the liquid tank 20, for example, a supply and discharge mechanism based on pumping means or another various means can also be utilized, but in practice, the aforementioned construction is particularly preferred because of its simple mechanism and because the supply and discharge actions can be conducted quickly and securely.

The reference numeral 40 designates a liquid level detector tube detecting the liquid level height upon supplying liquid on the bottom 21. The liquid level detector tube 40 is constructed so that the actuation of a components incorporating device 60, as hereinafter described, can be controlled on the basis of the detection signals of liquid level height by means of the liquid level detector tube 40.

The liquid level detector tube 40 has a detecting pipeline 41 in a vertical direction coupled to a lower part of the liquid tank 20 so as to allow the liquid to be flowed in it. The detecting piping 41 is provided at least partly with a transparent pipe portion 42 constructed of a transparent synthetic resin tube, and further provided at the transparent pipe portion 42 with a level sensor 43 detecting the liquid level height of the liquid flowed in. Thus the liquid level detector tube 40 is adapted to be capable of ascending or descending together with the liquid tank 20. The reference numeral 44 designates a support member for the level sensor 43.

The liquid level detector tube 40 is further provided, at an exhaust part of the detecting piping 41 upwardly opening to the atmospheric air, with valve means 45 that serves to limit the exhausting action upon inflow of the liquid and to control the inflow speed of the liquid thereby suppressing the pulsation of the liquid surface within the detecting pipeline 41. As a valve means 45, an exhaust throttle valve, for use in automotive vehicles, limiting the exhaust volume upon inflow of liquid can be preferably used, but another throttle valve, a needle valve or the like exhibiting a similar function to that may be naturally used. It is suitable to attach any of these valves to the detecting piping 41 so as to be easily detachable by means of an appropriate quick disconnecting coupling.

The liquid level detector tube 40 serves to control the actuation of a components incorporating and assembling device as described below by its detecting signals, and is provided so as to transmit detection signals, when detecting a liquid level height above a definite level set depending on the configuration of components, to a control section (not shown) of the apparatus for controlling the driving of the apparatus of this invention thereby to operate the components incorporating device.

The reference numeral 60 designates the components incorporating and assembling device composed of a multi-spindle articulated robot, etc., which is provided at an end of its hand 61 with a chuck device 62 having a pair of claw pieces 63, 63 capable of opening or closing. This components feeding and incorporating device 60 is controlled on the basis of detection signals by means of the liquid level detector tube 40, and constructed so that its actuation is initiated, when detecting that the liquid level height upon supplying of liquid to the bottom 21 of the liquid tank 20 has reached a definite level, by reason of signals from the apparatus control section receiving the detection signals whereas its actuation is stopped when the liquid level height is below the definite level.

The components incorporating device 60 is set and directed so that in conformity with the position of the main components body 1 set and secured in place on the main body setting and holding section 10, the positions of respective components set on the components setting jig 14, the position relation between the height of the liquid tank 20 installed to the main components body 1 and the liquid level height from the bottom 21 in the liquid tank 20, the installing operation of the liquid tank 20 to the main components body 1 by descending thereof and the aforementioned liquid level height, the device 60 may grab components such as a partition 5, a diaphragm, etc. set on the components setting jig 14, in order, with the chuck device 62 to shift each of them upwardly of the liquid tank 20 installed and fitted to the main components body 1, cause each of the components to descend to a corresponding position to the main components body 1, and conduct there a required deaeration operation, such as an operation of soaking each of the chucked components in a tilted posture in the liquid, and then an incorporating and assembling operation, which will be described below. The device is further set to correct the operations above, if necessary.

Operation

Now, for the assembly of a liquid-sealed vibration-proof mount, the operation of incorporating and assembling the respective components in the main components body 1 and simultaneously sealing liquid therein by use of the apparatus in the aforementioned example will be explained.

At the outset, the main components body 1 having an interior space and opening at its one end side is furnished and set onto the receiver support member 13 of the main body setting and holding section 10, with the opening side faced upwardly in a generally upright state. On the other hand, the components including the partition 5 and the diaphragm 4 are rested on the components setting jig 14 at its definite position.

Then the apparatus is initiated to operate by button pressing operation, etc. At the main body setting and holding section 10, the cylinder unit 16 of the locking mechanism 15 is actuated to advance the chuck device 17 positioned at its end, which grabs the main components body 1, which is in turn secured and held in place at the setting position.

After setting of the main components body 1, the liquid tank elevating or depressing mechanism 30 is actuated to drive the drive means 34, which causes the liquid tank 20 to descend together with the slider 33 as shown in two-dots-dash lines in FIG. 4, and the aperture 22 the liquid tank 20 possesses at the bottom 21 is fitted to the outer periphery of the main components body 1 held by positioning to the aperture, whereby the tank is installed to it through the seal member 50 so as to maintain the sealing condition At that time, in the liquid tank 20 there is stored a required amount of liquid W in the recessed portion 24 formed at a part of the bottom. After the aforesaid installing is terminated, the liquid W in the recessed portion 24 is forced out onto the bottom 21 to which the main components body 1 is fitted, and stored on the bottom, while being maintained at a predetermined liquid level required for incorporating components in the main components body 1.

That is, the loading float 25 provided upwardly of the liquid tank 20 is actuated with the actuation of the cylinder unit 26 to descend and received at its projecting portion 25*a* into the recessed portion 24 as shown in FIG. 6, whereby the liquid W stored in the recessed portion 24 is forced out onto the bottom 21 to which the main components body 1 is fitted, and flowed from an opening edge, appearing above the bottom 21, of the main components body 1 into the interior space 9. At that time, any suitable means is taken, whenever necessary, for example imparting a vibration to the main components body 1 so that bubbles may not be stuck to and not remain in the interior surface thereof.

Meanwhile upon supplying of the liquid onto the bottom 21, the liquid level detector tube 41 coupled to the liquid tank 20 detects that the liquid level of the liquid W has reached a definite level, and as soon as it has detected the liquid level height to be more than the definite level, the components incorporating device 60 is actuated on the basis of its detecting signal.

At the apparatus control section, it actuates the components incorporating device 60 when receiving the detecting signal of the liquid level height higher than the definite level. If the liquid level does not reach the definite level, then replenishing means such as a pump is operated to replenish a required amount of liquid to the liquid tank 20.

In detecting the liquid level by means of the liquid level detector tube 40, when the liquid is supplied, more particularly the liquid is supplied by descending of the loading float 25, onto the bottom 21 having the aperture 22 of the liquid tank 20, the liquid will fluctuate in a manner rising and falling because of its fluidization effect, concurrently with which inside the detecting piping 41 of the liquid level detecting tube 40 the liquid surface will pulsate up and down, as well. However, the valve means 45 provided at the liquid level detector tube 40 serves to limit the exhaustion of gas thereby making the liquid inflow speed into the detecting line 41 slow and suppressing a rapid rise of the liquid level, so that the pulsation of the liquid level in the vertical direction can be restrained. As a consequence, a correct detection of the liquid level by means of the level sensor 43 can be performed and any error operation of the detecting signal due to pulsation can be prevented.

Figure 10:
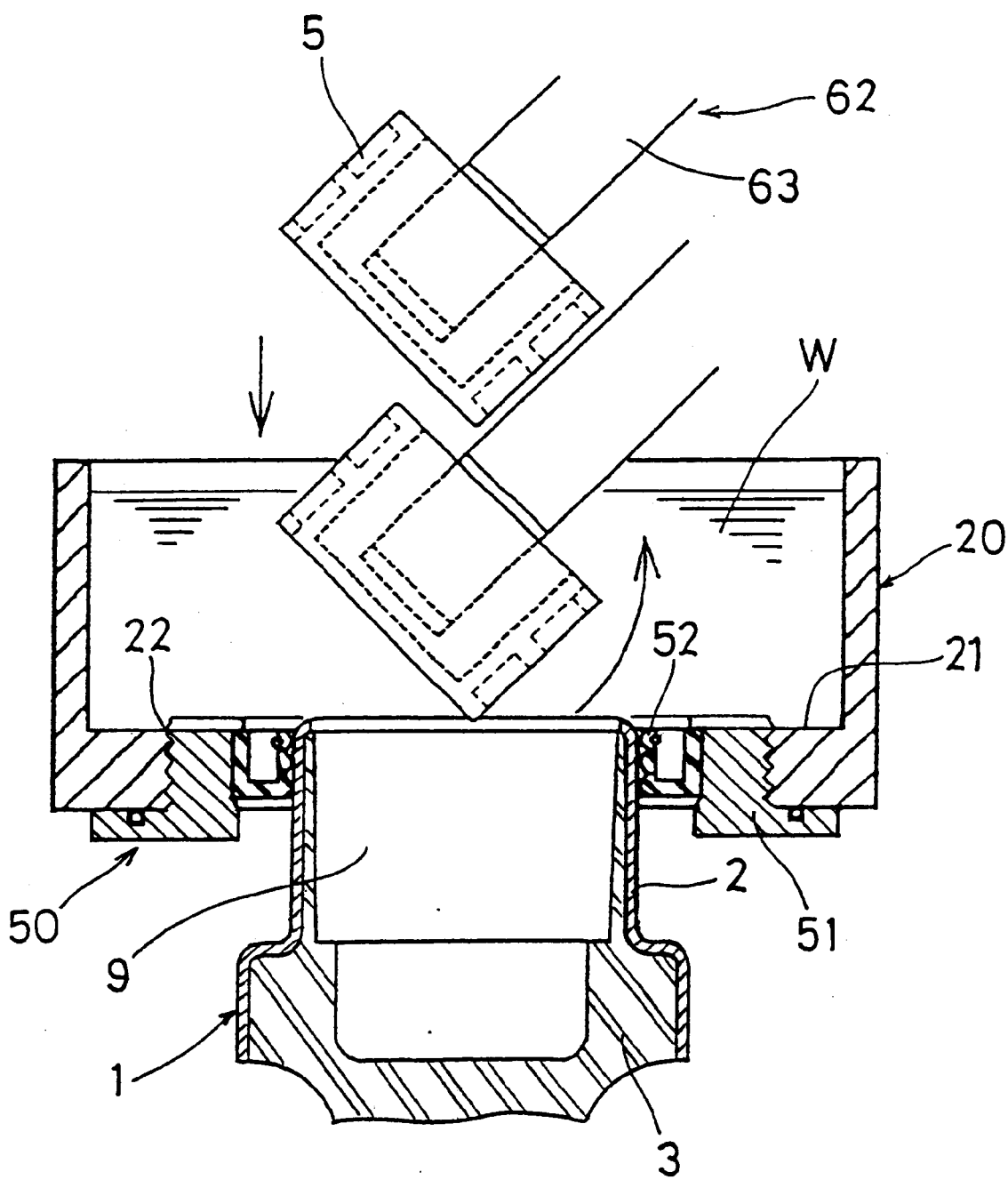
FIG. 10 is a partial enlarged sectional view showing a partition in the course of incorporation.

The components incorporating device 60 adapted to be actuated by the detecting signal grabs first the partition 5, among the components furnished and set in place on the components setting jig 14, with the aid of the chuck device 62 at the end of the hand 61 to shift it above the liquid tank 20, descends holding the partition 5 so grabbed in a required tilted posture, as depicted in FIG. 10, to soak it in the liquid W as stored on the liquid tank 20,thereby conducting deaeration, followed by recovering its horizontal posture in the liquid W and positioning to the main components body 1, and then fits the partition from the opening end to incorporate it into the main body. At that time, the partition 5 can be incorporated by means of a cylinder 65 for mounting the partition, etc. disposed upwards so as to be forced into the main components body 1 up to a predetermined position. Upon this operation, even if the liquid fluctuates more or less, it hardly fluctuates inside the liquid level detector tube 40, so that the level sensor 43 is free from error operation.

Figure 11:
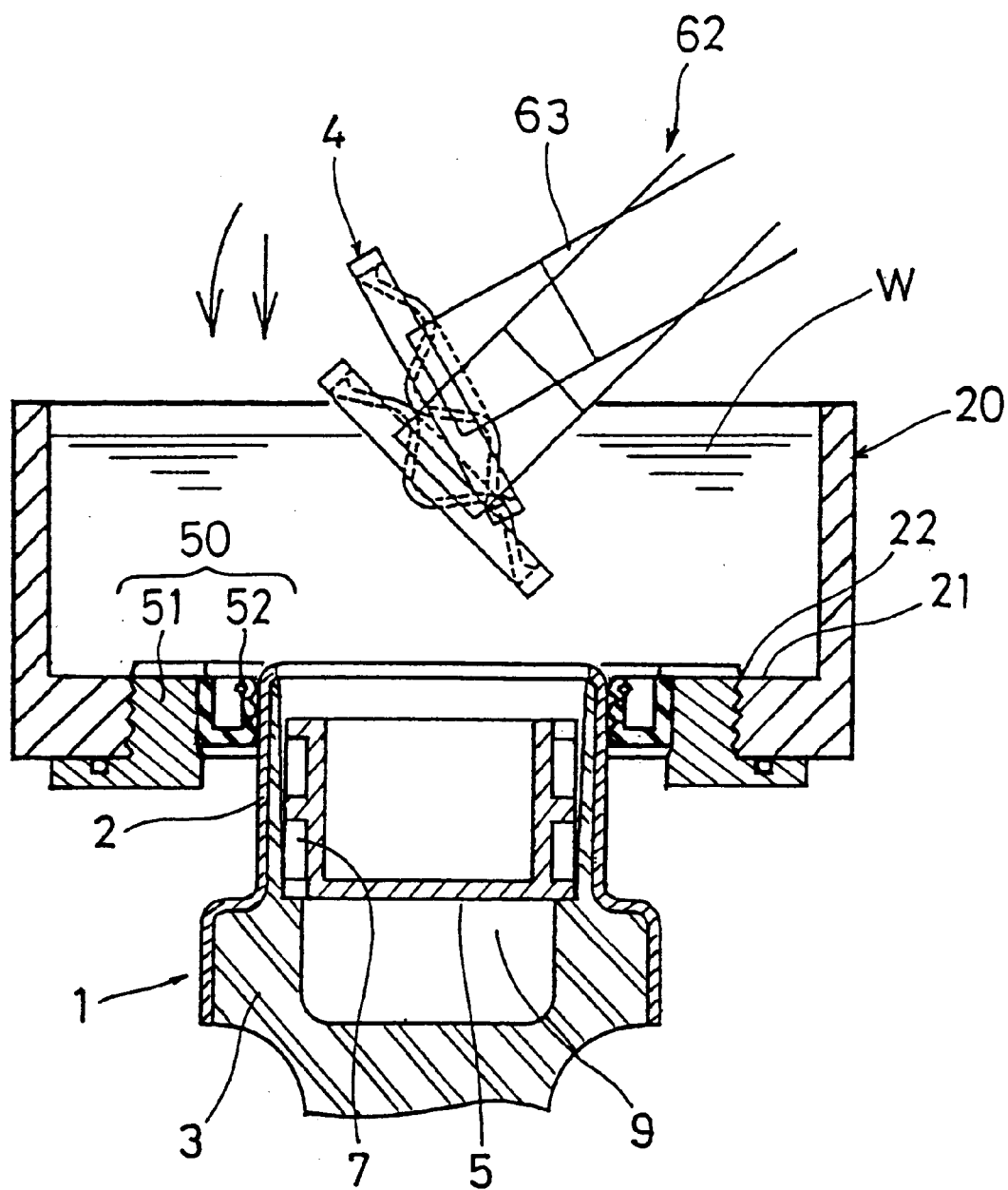
FIG. 11 is a partial enlarged sectional view showing a diaphragm in the course of incorporation.

After the hand 61 is restored to the initial position, the components incorporating device 60 is operated likewise to grab the diaphragm 4 set on the components setting jig 14 with the chuck device 62 of the hand 61 to shift it above the liquid tank 20, to descend while holding the diaphragm 4 in a predetermined tilted posture to soak it in the liquid W stored, thereby conducting deaeration followed by recovering it in a horizontal posture and positioning to the main components body 1, and then to fit the diaphragm from the opening end into it (cf. FIG. 11). The diaphragm 4 is assembled to the main components body 1 at a required position, if necessary, by forcing it with the cylinder in the same manner as the above, and held in a condition for the liquid being sealed.

In this way the respective components to be incorporated are grabbed by the action of the hand 61 and incorporated in order into the main components body 1. Thereafter the hand 61 is restored to the original position to be ready for the next cycle of incorporating operation.

In the aforementioned incorporation of respective components, in cases where the air accumulated at the underside of each of the components cannot be completely eliminated only with the tilted posture, it is better to deaerate them by taking advantage of liquid pouring means with a dispenser or vibration imparting means, etc.

When the incorporation of the respective components have been completed as described above, the cylinder unit 26 is actuated to cause the loading float 25 to ascend, attended with which the liquid W is flowed back into the recessed portion 24 and discharged out of the bottom 21. Thereafter the liquid tank 20 is elevated by the actuation of the liquid tank elevating or depressing mechanism 30 and released from the main components body 1.

Subsequently, the grabbing action with the chuck device 17 of the locking means 15 is released, and the chuck device 17 reverts to the initial position. The product thus assembled is transferred from the main body setting and holding section 10 to post-processing steps such as a crimping processing, whereby the assembly is finished.

In this way, the ascendable or descendible liquid tank 20 is installed to the main components body 1 by fitting of the aperture 22 to it, with the main components body 1 remaining to be set and held in place without shifting, liquid is supplied onto the bottom 21 within the liquid tank 20 and flowed into the interior space 9, simultaneously with which the respective components are incorporated and thereafter, the liquid is discharged from the bottom 21 and the liquid tank 21 is removed from the main components body 1. Therefore it is possible to incorporate the required components, i.e. the partition, etc. and at the same time to fill the liquid hermetically, without the necessity of soaking the entirety of the main components body 1 in liquid, nor conveying the components through the liquid.

In the apparatus of the example described above, respective actions can be set and controlled so as to conduct sequential relevant operations including: holding of the main components body 1 with the locking mechanism 15, installing of the liquid tank 2 to the main components body 1 by descending of it, supply and storage of liquid on the bottom 21 by descending of the loading float 25, incorporation of respective components with the components incorporating mechanism 60, discharge of the liquid out of the bottom 21 by ascending of the loading float 25, release of the liquid tank 21 from the main components body 1 by ascending of it, removal of the main components body 1 held at the main body setting and holding section 10 from it, and so on.

In accordance with this invention, as described above, it is possible to conduct efficiently and easily the components incorporating operation and the liquid sealing operation for the assembly of a liquid-sealed anti-vibration device by the use of a relatively small liquid tank such that has a volume necessitated for deaeration of components without shifting the main components body while setting and holding it in place and without soaking the entirety of it in the liquid, whereby the overall apparatus can be compactified.

In particular, in this invention, owing to the fact that the liquid tank is equipped with the liquid level detector tube so as to control the actuation of the components incorporating mechanism and further, the liquid level detector tube is provided with the valve means suppressing pulsation of the liquid surface, even if the liquid level within the liquid tank fluctuates to rise and fall by the supply action or components incorporating action, any pulsation of the liquid surface inside the detector tube due to the fluctuation is suppressed, so that the liquid level height can be detected correctly and error operation never occurs.

Therefore it is possible to avoid the troubles or problems that the components incorporating mechanism is suspended in the course of operation, and the operating condition and suspending are repeated, and consequently, it is possible to conduct the incorporating work with efficiency. Moreover since the components incorporating work can be conducted while the liquid level is above a definite level, the deaeration operation of components can be performed without inconvenience, with no danger of entrainment of air.

What is claimed is:

1. An apparatus for incorporating components and filling liquid for a liquid-sealed vibration-proof mount, comprising:

a main body setting and holding section, where a main components body of the vibration-proof mount having an interior space and an opening end is supported and secured in place in a substantially upright state with the opening end faced upwards;

a liquid tank positioned upwardly of the main body setting and holding section so as to be capable of ascending or descending, the liquid tank having an aperture at its bottom that can be fitted hermetically to an outer peripheral portion of the main components body, thereby permitting the liquid to be stored on the bottom in the condition that the liquid tank is installed to the main components body by fitting of the aperture to it;

elevating or depressing means of the liquid tank supporting the liquid tank above the main body setting and holding section and depressing the liquid tank toward the main components body so as to fit the aperture to it thereby installing the liquid tank to the main components body or elevating the liquid tank so as to release it from the main components body;

liquid supply and discharge means for supplying or discharging liquid onto or from the bottom of the liquid tank having the aperture in accordance with the installing action or release action of the liquid tank to or from the main components body;

liquid replenishing means for replenishing liquid where appropriate into the liquid tank; and a components incorporating mechanism for holding and shifting components inclusive of a partition and a diaphragm to the main components body in the liquid as stored on the bottom of the liquid tank and conducting the incorporating operation of the components into the main body components body;

wherein the liquid tank is provided with a liquid level detector tube detecting a liquid level height when liquid is supplied onto the bottom so as to be coupled to the tank, the liquid level detector tube including valve means for suppressing pulsation of the liquid surface;

the liquid level detector tube is adapted and constructed so that the actuation of said components incorporating mechanism may be controlled on the basis of a detecting signal of the liquid level height by means of the liquid level detector tube.

2. The apparatus for incorporating components and filling liquid for a liquid-sealed vibration-proof mount as set forth in claim 1, wherein said liquid level detector tube has a vertical detecting piping coupled to a lower part of the liquid tank in a manner permitting inflow of liquid;

the detecting piping is comprised of a transparent tube portion provided at least at a part thereof and a level sensor detecting a liquid level height of inflow liquid provided at the transparent tube portion so that detecting signals of the level sensor may be transmitted to an apparatus control section.

3. The apparatus for incorporating components and filling liquid for a liquid-sealed vibration-proof mount as set forth in claim 2, wherein the valve means for suppressing pulsation is provided at an exhaust part of the liquid level detector tube and is of an exhaust throttle valve for limiting the exhaust volume when liquid is supplied.

4. The apparatus for incorporating components and filling liquid for a liquid-sealed vibration-proof mount as set forth in claim 1, wherein the valve means for suppressing pulsation is provided at an exhaust part of the liquid level detector tube and is of an exhaust throttle valve for limiting the exhaust volume when liquid is supplied.

* * * * *